Feb. 6, 1962     E. A. GERBER     3,020,423
CRYSTAL FREQUENCY STABILIZATION
Filed July 8, 1959
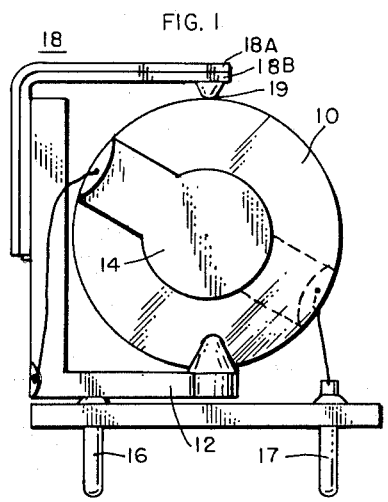
FIG. 1
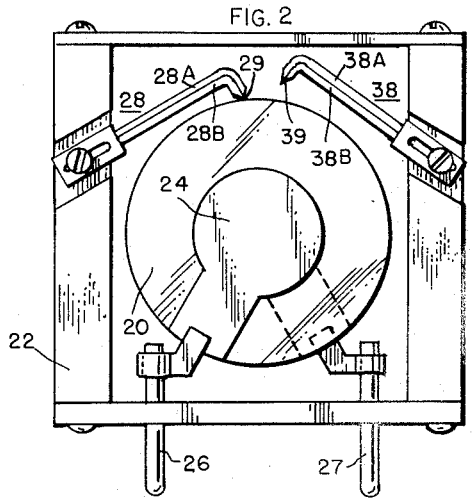
FIG. 2
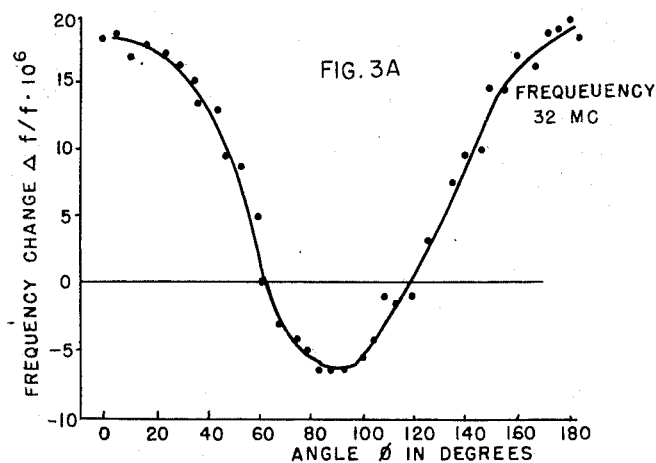
FIG. 3A
FIG. 3B
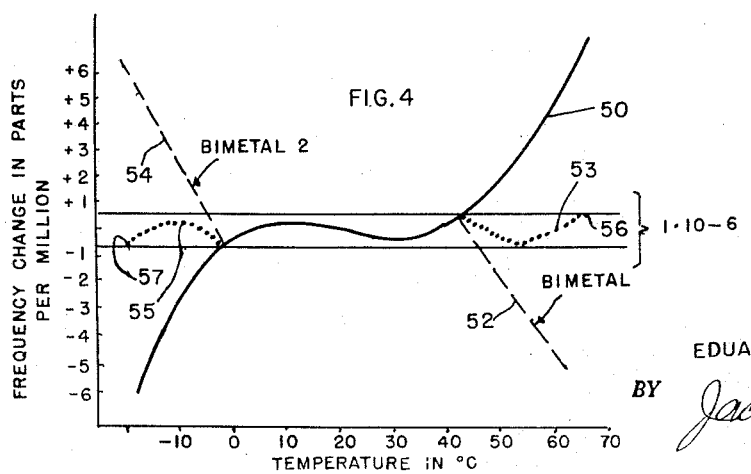
FIG. 4
INVENTOR,
EDUARD A. GERBER
BY Jack H. Linscott
ATTORNEY.

United States Patent Office 3,020,423
Patented Feb. 6, 1962

3,020,423
CRYSTAL FREQUENCY STABILIZATION
Eduard A. Gerber, Monmouth County, N.J., assignor to the United States of America as represented by the Secretary of the Army
Filed July 8, 1959, Ser. No. 825,854
3 Claims. (Cl. 310—8.9)
(Granted under Title 35, U.S. Code (1952), sec. 266)

The invention described herein may be manufactured and used by or for the Government for governmental purposes, without the payment of any royalty thereon.

This invention relates to frequency control and more particularly to crystal controlled frequency stabilizing means operable over a wide temperature range.

There are several means for maintaining a relatively constant frequency in a tuned circuit and one of the most common means relies on a crystal which has an extremely accurate frequency of oscillation. However the crystals themselves cannot maintain a constant frequency of oscillation over a wide temperature variation and even with the best orientation of the crystalographic axis such as in the common AT cut, in which the frequency-temperature drift is a minimum, a single crystal cannot be relied on to maintain a constant frequency over a wide range of temperatures.

Present means for overcoming the frequency-temperature drift of a crystal include providing a constant temperature oven in which the crystal is held at a constant level above the ambient temperature by the addition of heat.

Other methods of overcoming the frequency-temperature drift would include means for varying the frequency of a crystal, or its circuit as a function of temperature, but equal and opposite to the normal frequency-temperature drift of the crystal. One method of controlling the frequency of the crystal is that of varying the capacity of the electrodes or the case of the crystal. This could presumably be controlled by temperature to compensate for the frequency-temperature drift of the crystal.

The control of the frequency-temperature drift of a crystal by means of a cut that would provide the minimum possible frequency-temperature drift is not entirely satisfactory for modern requirements in that it lacks stability over a sufficiently wide temperature range. The control of the frequency-temperature drift of a crystal by varying the capacity between the electrodes or case structure would be cumbersome, hard to reproduce consistently and would lack stability. The control of drift by maintaining the crystal at a constant temperature requires a comparatively bulky device and takes extra power in the form of heat which also reduces the life of the crystal since aging is accelerated at higher temperatures.

It is therefore an object of this invention to provide an improved crystal, frequency-control system.

It is a further object of this invention to provide an improved system for compensating for the frequency-temperature drift of a crystal over a wide range.

It is a further object of this invention to provide a more compact, highly stable, simple and effective means for compensating for the frequency-temperature drift in a crystal over a wide range of temperature.

These and other objects are accomplished by applying a thermally controlled, mechanical pressure to certain nodal areas of a crystalline structure. This will increase or decrease the crystal frequency according to the direction of the applied pressure and the amount of increase or decrease will be proportional to the amount of pressure applied. The pressure is applied in the direction and in the amount necessary to compensate for the frequency-temperature drift of the crystal.

This devices will be more fully understood and other and further objects of this invention will become apparent from the following specifications and the drawings wherein:

FIG. 1 shows a simple device for applying pressure to a crystal.

FIG. 2 shows the use of multiple pressure applicators.

FIG. 3 shows a graph of the variation of frequency with pressure along certain axes of a typical crystal wafer; and FIG. 4 shows a graph of the frequency-temperature characteristics of a typical crystal and the stabilizing effect of pressure applied according to the teachings of this invention.

Referring now more particularly to FIG. 1 a crystal plate 10 has a conventional mounting or support 12 and the usual electrodes. The metal coating 14 of one electrode is visible and is connected through the support 12 to one of the terminals 16. The other electrode is on the other side or face of the crystal and is connected to the other terminal 17.

This is a completely normal physical arrangement of a typical crystal mounting which can be plugged into a radio set or an utilization device in a well known manner.

For the purposes of this invention a bimetal strip 18 is soldered or fastened to the support strip 12 in a cantilever mechanical structure, so that projection 19 will meet one edge of the crystal when the bimetal strip deflects downwardly.

The bimetal strip consists of at least two layers of metal 18A and 18B, having different coefficients of thermal expansion, integrally welded together so that the strip will bend as the temperature changes. The one end is securely fastened to the support 12. The other end 19 can apply a pressure in a direction and in any amount dependent on the choice of the metals in the bimetal strip and their physical and thermal characteristics. This phenomenon is well known and these characteristics can readily be obtained from any text on this subject.

Referring now more particularly to FIG. 2 the crystal plate 20 again has a conventional mounting structure 22 and electrodes such as 24 which are electrically connected to terminals 26 and 27 to be connected into utilization circuits. In this species of the invention a first bimetal strip 28 is rigidly attached to the supporting structure or frame 22 and makes contact with the edge of the crystal disc or wafer 20. In this variation a second bimetal strip 38 is similarly mounted to the frame and engages an edge of the crystal disc 20 with projection 39. These two bimetal strips have metal layers 28A, 28B, 38A, and 38B, respectively, as in 18 of FIG. 1, so that the deflection of the strip varies with the temperature.

With one end of each strip held rigid each strip can apply a separate and distinct amount of frequency-temperature compensating pressure against the wafer or crystal plate. In this species only one bimetal strip projection 29 is shown engaging the crystal. The other projections 39 is shown not in contact with the edge of the crystal plate. This would be the case where the pressure applied by each of the strips might be to produce an opposite effect or where the pressure of the second strip is not yet needed to supplement that of the first strip.

The actual number of strips that could be used and the way that the pressure may be applied can be varied considerably and will be chosen in accordance with the degree of drift correction that is desired and the temperature range that must be accommodated.

In operation this device is based on the frequency sensitivity of thickness-shear quartz crystal resonators to external pressure. FIG. 3A shows a graph of the effect of a compression stress of 100 grams on the frequency of a third overtone AT cut quartz crystal resonator as a function of the orientation of the stress with respect to the crystallographic X axes. It is noted that the resultant frequency change can be either positive or negative, depending upon the orientation of the stress.

In addition to being sensitive to the orientation it has been found that the frequency change for any particular orientation is always proportional to the amount of stress. Thus it is apparent that if the stress is applied in one direction, for example, that at about 90° with respect to the crystallographic axis the frequency of the crystal will decrease as the pressure is increased, if it is applied substantially along the crystallographic axes, the frequency of the crystal will increase with an increase in pressure.

FIG. 3B illustrates the angle of applied pressure with respect to the crystallographic axis in a typical crystal.

FIG. 4 shows a graph of the results obtained where the stress is made temperature dependent and applied to certain points on the circumference of the crystal plates according to the teachings of FIG. 3. The solid curve 50 of FIG. 4 represents a typical frequency-temperature relationship for an AT cut quartz crystal resonator. The frequency drift due to temperature change remains within $1.10^{-6}$ for a temperature range from 0 to 43° C. The application of pressure varying with temperature could change the frequency of the crystal resonator as indicated by the two dashed lines 52 and 54. The dotted curves 53 and 55, show how the original frequency-temperature curve of the resonator will be corrected by the application of the pressure. The temperature range of the same crystal is extended to twice its original value within the same frequency tolerance.

In the structures shown in FIGS. 1 and 2, temperature dependent pressures are created by the bimetal strips and in the typical example illustrated in FIG. 4 one of them starts to touch the circumference of the crystal at a temperature of 43° C., in the direction in which the frequency is lowered by the addition of pressure. This can be made to provide the correction illustrated by the dotted line 53. To compensate for the frequency drift at lower temperatures the second bimetal strip as illustrated in FIG. 2 comes in to action and applies its pressure in the direction in which the frequency of the crystal will be increased as the external pressure is increased, this time in proportion to a decrease in temperature. The resultant drift characteristic is again illustrated by the dotted line 55 and provides a very considerable improvement over the best possible results obtained with this particular cut of crystal without compensation.

The proper points of contact with respect to the crystallographic axes of the crystal plate can be selected with the help of the curve of FIG. 3A and with reference to FIG. 3B. The amount of frequency correction for a given temperature change can be very smoothly controlled by choosing the direction in which the pressure is applied. Thus when the maximum change in frequency for a given change in temperature is required the angle representing the largest change in frequency for a given change of temperature is employed. If less correction is needed for a given change of temperature, the pressure can be applied on either side of the angle of maximum frequency-pressure change.

Alternatively a bimetal of less sensitivity or of less motion for a given change in temperature may be used. The wide choice regarding the dimension of bimetal permits one to adapt this method to almost any given condition.

The mechanical force appled by a bimetal strip with a given temperature change can be obtained in readily available data on this thermomechanical device or may be derived from the well known relation between the dimensions and properties of a bimetal, the temperature difference, and the mechanical force that can be applied by a cantilever beam.

A soldered joint is used for maintaining the bimetal strip to the frame support in FIG. 1. A simple bolt and guide channel are used to hold the bimetal strips in place in FIG. 2. It will be obvious that these strips may be fastened in any of many other ways for securing two objects together physically. The only requirement is that the strength of the fastening be sufficient to insure that an adequate pressure can be applied to the crystal.

The frequency-temperature drift correction by a single bimetal strip may be limited since the normal bimetal temperature pressure change is usually linear while the frequency-temperature drift is usually non-linear over the useful operating range. The correction may be extended beyond the useful range illustrated in FIG. 4 by additional pressure points.

In such a case a second or third bimetal strip would be positioned to begin applying this pressure at point 56 or point 57 of the curve illustrated in FIG. 4 to provide an even greater extension of the frequency stability within extreme temperature limits.

Since the orientation of the axis of pressure with respect to the crystallographic "X" axis is critical, it may be desirable to notch or mark the crystal at the point necessary for the correct application of pressure.

The most stable cuts that are available may be used in this device with the object of even further improvement of their temperature characteristics, although one of the advantages of temperature compensated crystals is that they provide a fairly accurate frequency and require no compensating stresses on the crystal under normal, room temperature, operating conditions. On the other hand, it is possible with this device to use other cuts of the crystal that may have better electrical or mechanical characteristics than the AT cut, but would be unsatisfactory with regard to drift characteristics.

The curves illustrated apply to thickness-shear mode of vibration and to the familiar AT cut of the crystal. This device may, however, be applied to any other crystalline structures having similar temperature-pressure characteristics.

It is obvious that many modifications of the above invention are possible and will be obvious to those skilled in the art.

What is claimed is:

1. A temperature compensating device for a crystal that decreases in frequency as pressure is applied along a first axis across opposing nodal points in a first direction and increases in frequency as pressure is applied along a second axis across opposing nodal points in a second direction comprising a rigid frame for supporting said crystal, a first temperature sensitive device attached to said rigid frame for applying pressure across said opposing nodal points in said first direction as the temperature increases above a first given temperature and a second temperature sensitive device attached to said rigid frame for applying pressure across said opposing nodal points in said second direction as the temperature decreases below a second given temperature.

2. A temperature compensating device for a frequency controlling crystal with a rising frequency-temperature coefficient above a first temperature level and a falling frequency-temperature coefficient below a second temperature level comprising a rigid frame for supporting said crystal, a first bimetal strip attached to said rigid frame positioned to apply pressure across opposing nodal points in a first direction as the temperature increases above said first level, and a second bimetal strip attached to said rigid frame positioned to apply pressure across opposing nodal points in a second direction as the temperature decreases below said second level.

3. A temperature compensating device for a frequency controlling crystal that increases in frequency as the temperature increases above a first level and as pressure is applied across opposing nodal points along a first axis, and decreases in frequency as the temperature decreases below a second level and as pressure is applied across opposing nodal points along a second axis comprising a mounting for said crystal, a first bimetal strip attached to said mounting positioned to apply pressure across said opposing nodal points along said second axis as said temperature increases above said first level, and a second bimetal strip attached to said mounting positioned to apply pressure across opposing nodal points along said first axis as said temperature decreases below said second level.

References Cited in the file of this patent

UNITED STATES PATENTS

| | | |
|---|---|---|
| 2,171,243 | McKesson | Aug. 29, 1939 |
| 2,515,083 | Franklin | July 11, 1950 |
| 2,839,695 | Robey | June 17, 1958 |
| 2,878,452 | Rohr et al. | Mar. 17, 1959 |
| 2,878,454 | Leming et al. | Mar. 17, 1959 |